United States Patent [19]

Brown

[11] Patent Number: 4,946,272

[45] Date of Patent: Aug. 7, 1990

[54] STABILIZED EQUIPMENT SUPPORT, PRIMARILY FOR USE WITH LIGHT-WEIGHT CAMERAS

[76] Inventor: Garrett W. Brown, 515 Addison Ct., Philadelphia, Pa. 19147

[21] Appl. No.: 247,900

[22] Filed: Sep. 22, 1988

[51] Int. Cl.$^5$ .................... G03B 17/00; G03B 21/00
[52] U.S. Cl. .................... 352/243; 248/123.1; 354/82; 354/293
[58] Field of Search ............. 352/243; 354/81, 82, 354/293; 248/123.1

[56] References Cited

U.S. PATENT DOCUMENTS

| | | | |
|---|---|---|---|
| 3,105,430 | 10/1963 | Fernelius | 352/243 |
| 4,244,500 | 1/1981 | Fournier | 352/243 |
| 4,437,753 | 3/1984 | Dunn | 352/243 |
| 4,474,439 | 10/1984 | Brown | 352/243 |

*Primary Examiner*—Monroe H. Hayes
*Attorney, Agent, or Firm*—Weiser & Stapler

[57] ABSTRACT

A stabilized support which is both small and light-weight in construction, and which receives the equipment with which it is used upon an expanded support network which deploys (positions) the supported equipment in a manner which alters the position of its center of gravity so that the resulting unit can be effectively supported at its center of gravity by an interrupted handle which includes a major portion which can be engaged for overall support and transport of the unit, and a minor portion which includes a control surface which is accessible by the operator's hand to achieve controlled orientation of the equipment support, separated by an appropriated device for providing mutual angular isolation between the two portions of the compound handle. The handle for the equipment support therefore provides all of the functions which are necessary for appropriate operation of the equipment which it supports, such as a portable video camera or the like.

126 Claims, 13 Drawing Sheets

STABILIZED EQUIPMENT SUPPORT, PRIMARILY FOR USE WITH LIGHT-WEIGHT CAMERAS

BACKGROUND OF THE INVENTION

The present invention generally relates to the field of stabilized equipment supports, and more particularly, to an apparatus for supporting light-weight cameras or other equipment which may be orientation- and/or stability-sensitive so that such equipment is isolated from such unwanted motions.

So-called "hand-held" cameras have been in existence virtually since the beginning of photography. Whether for still pictures or for motion pictures, by virtue of the artistic needs of such media, every model of camera which was light enough to be lifted has at some time been "held" by a human operator. The inherent instability of such equipment immediately becomes a corresponding factor.

For example, in connection with still photography, slow emulsions or reduced lighting often tends to require relatively long exposure times for the films being used. Any motion of the camera, particularly angular motion, therefore tends to produce a blurring of the image. However, it is axiomatic that the human operator is constantly subject to some degree of uncontrollable motion. What is more, these motions tend to increase and are even less controlled if the salient parts of the operator's anatomy are operating under load, through an exerted force. This, of course, applies to the hands and arms of an operator which are holding and/or supporting such camera equipment. These problems are multiplied when motion pictures are involved, since the operator may now need to walk and at times even run with the camera to obtain the necessary images.

By virtue of their construction, cameras are compact, relatively dense objects, with relatively little rotational inertia. What is more, such cameras traditionally have a center of gravity which is located within the camera, at a position which is inaccessible to the operator. As a result, holding such a mass by its outer surfaces means that most motions of the operator will tend to exert considerable leverage in directions effectively tangential to the camera's center of gravity, and will therefore result in an angular motion of the camera, around the axis which passes through the camera's lens. This kind of motion (whether in "pan", "tilt" and/or "roll") is quite disturbing to both still photography and motion picture photography. While it is true that within the limits of human strength, the operator's hands and arms can often dampen out such spatial motions (up/down, side-to-side, in/out), it is again axiomatic that they cannot simultaneously apply the delicate "touch" (contact) which is generally needed to effectively orient the camera in the course of its operation.

The history of photography is replete with attempts to solve these problems. One rather early approach to this may be found in U.S. Pat. No. 2,007,215 (Remey), which teaches a counterbalanced and isolated support for a portable motion picture camera which generally takes the form a needle extending from a handle for the camera, received in a cup associated with the camera's body. This "needle-in-cup" configuration served to provide a degree of isolation between the camera and the operator, but suffered from a variety of disadvantages. For example, the disclosed arrangement lacked an effective means of orientation, and employed burdensome counterweights, combining to require the unit to be held at an awkward distance from the operator's body. What is more, the unit could not be panned relative to the operator, and was difficult to trim into balance.

Still other approaches to the problem involved devices having gyro-controlled prisms and/or mirrors that could operate to alter the optical path for the light entering the lens of the camera in order to compensate for vibrations of the unit. While these devices were somewhat effective for certain high-frequency vibrations, they were relatively ineffective for motions along the roll axis (around the axis passing through the lens). What is more, they added weight to the overall unit and tended to introduce motions of their own if their operational limits (parameters) were overstepped.

Yet another approach to camera stabilization involved the use of various camera pods, shoulder mounts and braces which were developed in an attempt to secure the camera's mounting (position) to the operator's body, so that only the motions of the body's trunk would effect the shot then in progress. However, the resulting motions were only somewhat reduced since such measures tended to produce motions of a slightly longer period, and therefore proved to be only partly effective since constant movement remained an ever present factor in connection with a human operator. Thus, unacceptable angular motion nevertheless tended to prevail, even when the operator was standing still, and became even more of a factor when the operator attempted to walk or run with the unit.

It was in this environment that the devices described in my U.S. Pat. No. Re. 32,213 (Brown), and later U.S. Pat. No. 4,208,028 (Brown et al) were developed. The devices described in these patents generally approach the problem of camera stabilization by providing a spring-loaded equipoising arm for supporting a gimbal-mounted expanded camera system. The disclosed unit serves to isolate the camera from both angular and spatial motions and has proved to be quite effective in allowing the camera operator to produce exceedingly stable images in a variety of different situations. Indeed, the unit serves to allow an ambulatory camera operator to produce a moving shot equivalent to those previously made by camera "dollies" running on a track, the previously recognized method for capturing such sequences. As a consequence of this, such devices have become standard tools in the motion picture and video industries, operating to satisfy a variety of divergent needs in such industries.

However, such devices were primarily designed to support relatively large film and video cameras, exhibiting significant weights. Even the lightest of cameras contemplated for use in connection with such systems were on the order of 20 pounds, and it is presently not uncommon for complete systems (including the stabilized mounting, camera, and supporting equipment) to exceed 90 pounds as operating requirements become more varied and complex. Interestingly, it was discovered that as the weight of the unit increased, the stability of the resulting image also tended to increase (presumably resulting from the use of a more inert unit). It was therefore believed that the lighter the camera, the less useful would be such a stabilization device.

Indeed, special steps were taken in U.S. Pat. No. 4,474,439 (Brown) to develop a more sophisticated version of the expanded, gimbal-supported camera system having a configuration which was adjustable to respond to the various operational requirements of the ever-increasingly sophisticated uses for such equipment. Nevertheless, the total weight of the resulting unit was approximately 17 pounds (without the camera), and it was found that even this light-weight unit could not be used to effectively support a camera lighter than itself.

It was at this point in time that another aspect of camera technology evolved: the portable (consumer-operated) video camera. A variety of formats for this product were initially developed, with continued efforts towards miniaturization and simplification due to the unit's consumer-oriented market. Initial attempts at developing an independent, fully self-sufficient consumer video camera (i.e., "CamCorder") involved the so-called "full-sized" CamCorders, self-contained camera and recording units designed to fit on the shoulder of the operator, with a viewfinder mounted forward and to the side of the resulting unit. These "full-sized" CamCorders tend to weigh an average of 5.5 pounds in their more recent implementations. From this there followed the development of the so-called "compact" CamCorders, which are rapidly capturing a significant portion of the consumer market. These "compact" CamCorders generally operate either in the VHS-C or 8 mm video formats, and are comprised of self-contained camera and recording units which are generally on the order of 2.6 pounds in weight. Due to their small size, such cameras are generally supported entirely by the hand (or hands) of the operator, rather than being placed over the operator's shoulder, being held in front of the face with the viewfinder (generally top-mounted) in close contact with the operator's eye.

By virtue of their appeal to the general consumer, a large number of video "CamCorders" have been sold. Each of these units is of course subject to the instability inherent in larger, commercial units. However, in addition to the traditional instability of a hand-held camera, these units are being operated by amateur photographers, still further complicating matters. This is particularly so in connection with the relatively small "compact" CamCorders, which are entirely hand-held, as distinguished from the "full-sized" CamCorders which at least benefit from the support of the operator's shoulder. In any event, the common result is an unstable and often unacceptable video image. This is particularly so when the operator departs from a stationary position, and attempts ambulatory operation of the unit. The unfortunate result of this is a video camera which, by virtue of its size, is particularly portable, but which is unable to achieve its full potential because of its inherent instability.

Thus, the ultimate goal is for the amateur operator to be able to use the full potential of the portable video cameras which have recently been developed, to follow his children, to walk with friends, or to amble through interesting locales, while producing images that are smooth and free of the degradation in apparent resolution which is caused by vibration of the unit, and of the troublesome effects of slower, low frequency oscillations. Improvements to the video cameras themselves have aided in achieving this goal. For example, most of these video cameras now routinely operate at extremely low light levels (often less than 5 lux), and incorporate devices that automatically control focus, iris and color balance. Resulting from such simplification, most of the problems faced by the professional motion picture producer are essentially absent from these consumer oriented counterparts, inherently facilitating the camera operator's task. In essence, the only major problem which remained to be solved involved the stability of the camera in the course of these operations.

Efforts have been made to respond to this problem, primarily by providing miniature versions of many of the traditional camera supports which have been used in connection with the larger, commercial camera equipment used by the professional. Miniaturized shoulder mounts, braces and monopods, and even variations on the optically stabilized approach which operate to orient the lens and video receptor (CCD chip), have been attempted. However, these devices have failed to do any more than alleviate the problem of instability, and all tend to perpetuate the respective peculiarities and problems associated with their full-sized counterparts.

This trend toward the miniaturization of camera stabilizing equipment led me to consider a miniaturization of the camera support disclosed in my earlier U.S. Pat. Nos. Re. 32,213; 4,208,028; and 4,474,439. However, this too proved to be less than satisfactory in implementation.

First, there is the impracticality of such an approach. The average weight of a consumer video camera (between 3 and 6 pounds) can generally be adequately supported by an operator for a reasonable duration. Of course, this will vary according to the strength of the operator and the duration of the "shooting period". However, since the average operator is well able to adequately support the camera for an acceptable (and useful) period of time, it is unlikely that all but the most ardent user of the apparatus would find the need, or even be willing to pay for or indeed wear the elaborate equipoising arm and suit of such a system.

Second, as previously indicated, video cameras weighing 3 to 6 pounds tend to develop an insufficient counterbalancing weight, and are therefore inappropriately combined with even the smallest available version of such equipment. Further reducing the size of such equipment would only tend to produce a device which is nevertheless cumbersome, and noticeably less stable than the professional version of the unit because of the insufficient inertia which would be available to oppose the forces applied to the unit by the operator. In essence, this can be summarized by considering that while it would be possible to reduce the size of the support apparatus, it is impossible to correspondingly reduce the size of the operator's hands, resulting in excessive forces being applied to the "orienting" portions of the floating camera support.

Another simplification of such an apparatus which has been attempted by another practitioner in the art is to delete the equipoising arm in favor of a handle attached directly to the gimbal yoke of the camera support described, for example, in U.S. Pat. No. 4,474,439. However, this generally results in less stability for the overall unit than was originally intended, and still requires two hands for operation of the unit in a non-ergonomic offset position which tends to cause undue strain on the user's wrists and inordinate forces on the extended arm of the user. This is still further complicated by the significant size and excessive weight of the resulting unit, so that the ultimate results achievable by such a unit would by and large be considered unacceptable.

Thus, these various approaches failed to provide an apparatus which was fully and satisfactorily operative in effectively eliminating the problems of instability encountered in connection with operation of the ever-improving portable camera equipment which has been developed, and it therefore remained to develop a stabilized equipment support which was particularly well suited to the special requirements of light-weight, hand-held camera equipment, particularly consumer-oriented video cameras and the like.

SUMMARY OF THE INVENTION

It is therefore the primary object of the present invention to provide a stabilized support for isolating equipment from unwanted motions resulting from the operation of such equipment.

It is also an object of the present invention to provide a stabilized equipment support which can be hand-held by the operator.

It is also an object of the present invention to provide a stabilized support for light-weight camera equipment or the like.

It is also an object of the present invention to provide a stabilized camera support which is sufficiently simple in construction and use to facilitate the efforts of even amateur operators, at a reasonable cost to the user.

It is also an object of the present invention to provide a stabilized camera support which is ergonomically suited to its operator, permitting maximized efficiency of the operator in terms of the forces which are applied to the unit, and the resulting torques which are produced.

It is also an object of the present invention to provide a stabilized camera support which facilitates supporting the weight of the camera equipment which is being used, to allow an extended use of such equipment even in connection with relatively heavy units.

It is also an object of the present invention to provide a stabilized camera support, primarily for use in connection with light-weight camera equipment, which is both simple to use, and well adapted to a variety of applications.

It is also an object of the present invention to provide a stabilized camera support, primarily for use in connection with light-weight camera equipment, which permits an independent "hand-held" use of the camera, yet which is adaptable to "on-the-shoulder" operations.

These and other objects are achieved in accordance with the present invention by providing a stabilized support which is both small and light-weight in construction, and which receives the equipment with which it is used upon an expanded support network which complements the supported equipment in a manner which alters the position of its center of gravity so that the resulting unit can be effectively supported at its center of gravity using a novel handle assembly.

The present invention primarily relates to the field of camera-stabilizing support equipment, particularly equipment which is useful in connection with consumer-oriented camera equipment. The term "camera" is intended to mean any image recording device which is intended to be directed in a specific fashion to capture an image, or sequence of images, either in the same or different direction. The camera may exhibit a "field of view" which is the angular size and shape of the aperture through which it operates, or may be aimed in a simple linear fashion, operating with respect to a given "point". However, it is to be understood that use of the term "camera" is not intended to restrict the types of devices other than cameras (i.e., "equipment") which may be employed in accordance with the present invention, but only to indicate the general characteristics of a device requiring isolation from at least a part of the spectrum of unintentional motions which can be induced in the course of its operation, either by a human operator (i.e., hand-held) or in connection with a mechanical operating system (i.e., a stabilized mounting).

Similarly, the term "view finding device" or "viewfinder" refers to any of a number of devices which may be used by the operator to ascertain the direction in which the equipment is directed at any given point in the course of its operation, or the field of view which is being addressed, preferably without the need for the eye of the operator to be in contact with the device. This may include any of a number of TV monitors, heads-up displays, projections, or laser indicators, as well as the simpler and more traditional optical sighting devices (i.e., gun sights).

The equipment support is generally comprised of a platform for receiving the equipment (camera), and which is counterbalanced by a view finding device and a battery or batteries for operating the equipment. Appropriately configured struts are preferably used to interconnect the platform and the view finding device, and to provide support for the system's battery or batteries. The platform further preferably incorporates an adjustment mechanism (e.g., an "x-y" table) for permitting relative adjustment between the equipment receiving platform and the handle which supports the assembly, to achieve an appropriate balance of the resulting unit. This adjustment mechanism includes a fitting for receiving the handle which supports the platform at a position which intersects with the center of gravity of the equipment and the supporting system which receives it, to achieve an appropriate static balance of the resulting unit about each of three perpendicular axes.

The supporting handle preferably takes the form of a two-part (i.e., "interrupted") handle which is generally comprised of a major portion which can be engaged for overall support and transport of the unit, and a minor portion which includes a generally cylindrical control surface which is accessible by the hand (preferably the thumb and index finger) to achieve controlled orientation of the equipment support, which are separated by an appropriate device for providing mutual isolation between the two portions of this compound handle. Preferably, the isolation device which separates the two distinct portions of the handle is a gimbal or other device which provides angular isolation about three generally perpendicular axes, while being virtually frictionless as well as freely pivotable and rotatable to permit proper control of the equipment and its support. Thus, the handle not only operates to receive forces for both support and transport of the equipment, but also to appropriately orient the device, by functioning to provide mutual isolation between the supported equipment and the angular influence of the forces which are applied to the handle. A novel, miniature gimbal is provided to separate the two sections of the handle in its preferred embodiment.

The handle for the equipment support therefore provides all of the functions which are necessary to appropriately operate (support, transport, orient) the equipment which it supports. The major portion of the handle is capable of being strongly grasped by the hand of the user, serving to support the entire mass of the unit and to transport the mass in space, or of being mechanically mounted for isolated support, as desired. The minor portion of the handle defines a control surface which permits limited access by the thumb and index finger, at a position just below the supported equipment, to orient the equipment as desired. The result is an appropriately balanced structure, poised on a gimbal and appropriately adjusted to facilitate operation of the unit by its user. To this end, the unit is preferably adjusted so that it is level and slightly bottom heavy, with a slow pendular period which is relatively unaffected by rapid changes in spatial movement of the overall unit.

As a result, the supported equipment can be carried and aimed by the operator, using only one hand if desired, without being significantly affected by the operator's unwanted bodily movements. In connection with a camera, this permits the operator of the unit to perform stabilized "static" shots, as well as to facilitate ambulatory use of the unit by the operator, permitting use of the unit while walking or running, or even while climbing stairs. In addition to facilitating "floating" operation of the camera, the unit is additionally foldable into a convenient shoulder mount to facilitate certain kinds of non-ambulatory telephoto shooting.

For further detail regarding a preferred embodiment stabilized equipment support in accordance with the present invention, reference is made to the detailed description which is provided below, taken in conjunction with the following illustrations.

BRIEF DESCRIPTION OF THE DRAWINGS

In the several views provided, like reference numerals denote similar structures.

DETAILED DESCRIPTION OF THE PREFERRED EMBODIMENT

Figure 1:
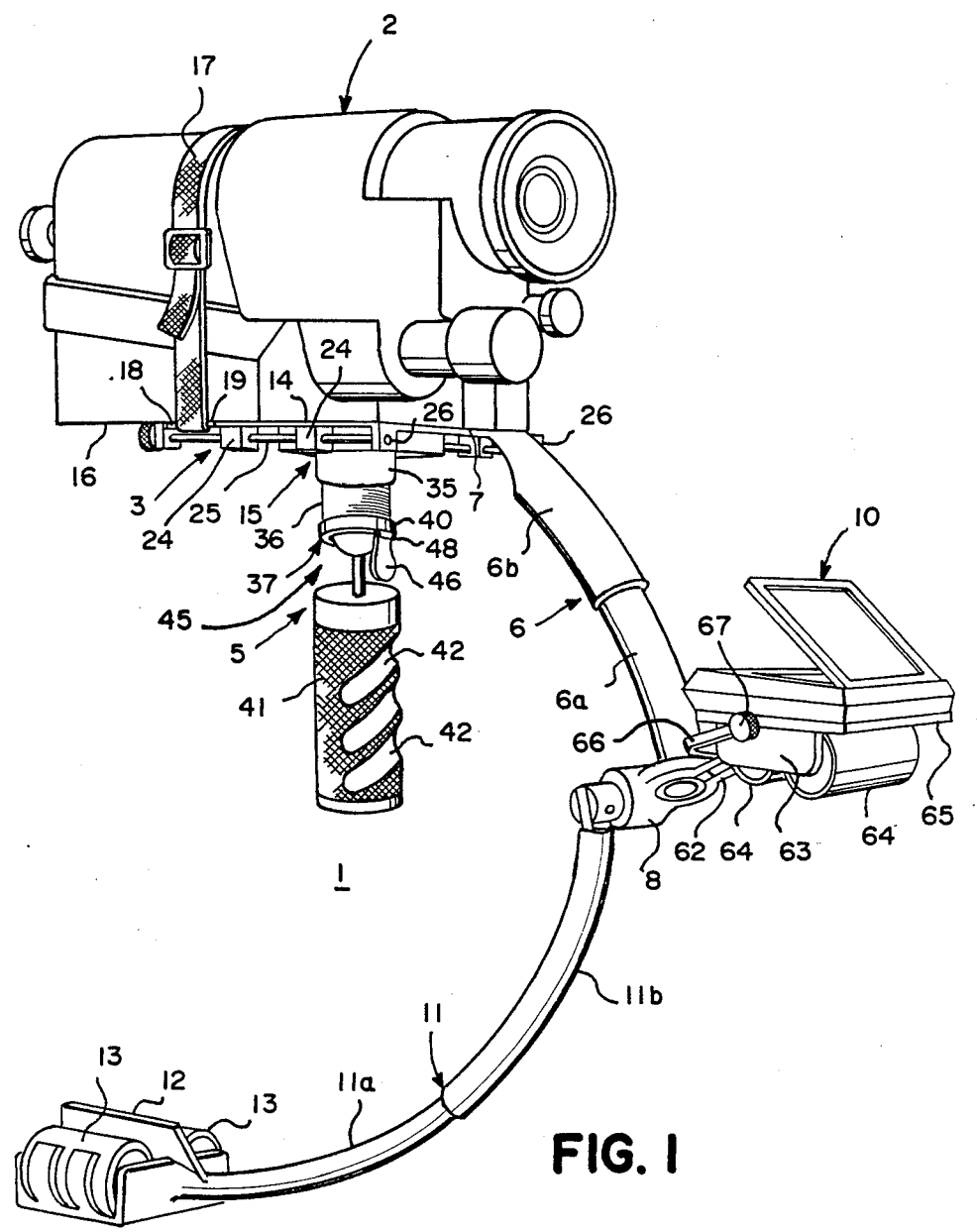
FIG. 1 is a perspective view of the stabilized equipment support of the present invention, shown in connection with a video camera.

FIG. 1 generally illustrates a stabilized support 1 for use in connection with a camera 2 which, in the embodiment illustrated, corresponds to a "compact" video camera (" CamCorder") of the type which is conventionally available to the consumer. As previously indicated, it will be understood that the camera 2 has been selected only for purposes of illustration, and that any of a number of camera configurations other than that shown in the drawings, as well as other types of "equipment" to be supported, may be used with the stabilized support 1 which is illustrated.

The stabilized camera support 1 includes a platform 3 for receiving the camera 2, and for receiving the novel handle 5 which will be described more fully below. A first strut 6 extends from forward portions 7 of the platform 3 to a mounting 8 for receiving a view finding device 10. As with the camera 2, it is to be understood that the view finding device 10 which is shown in the drawings has been selected only for purposes of illustration, and that any of a number of available view finding devices may be used in connection with the stabilized camera support 1 of the present invention. Further extending from the mounting 8 is a second strut 11, which extends to a holder 12 for receiving one or more batteries 13 for providing the power needed to operate the camera 2.

These basic components of the stabilized camera support 1 will be discussed more fully below. However, it is to be noted here that the various components of the stabilized support 1 have been carefully located to provide an expanded, balanced camera-equipment-receiving structure having a mass (including all structures) which is disposed along at least two perpendicular axes (either as a plurality of discrete components or as a single longitudinally disposed mass) in a fashion which increases the rotational inertia of the unit, and which provides access to its center of gravity, to permit an adjustment of the relationship between the handle 5 of the stabilized camera support 1 and the center of gravity of the resulting unit, and thus provide a stabilized mounting for isolating the camera 2 from the broad spectrum of unwanted high-to-low-frequency angular motions which may be encountered. This is accomplished irrespective of the particular mass or masses which are to comprise the stabilized camera support 1, as well as the configuration for the camera 2 and the view finding device 10, in a light and rigid interconnecting structure which permits access to the center of gravity of the resulting unit to achieve the desired stabilizing effect.

Figure 2:
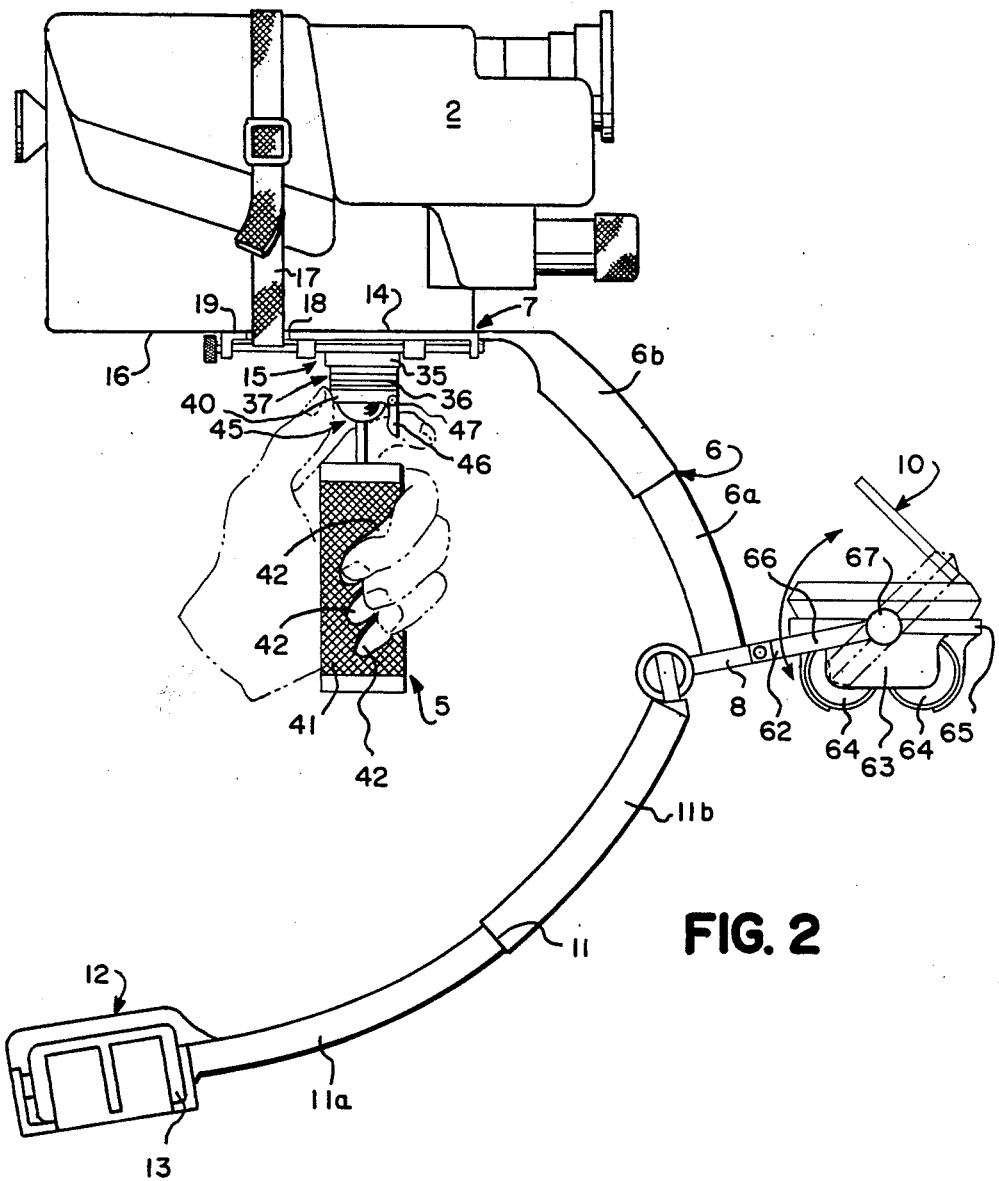
FIG. 2 is a side elevational view of the stabilized camera support of FIG. 1.
Figure 3:
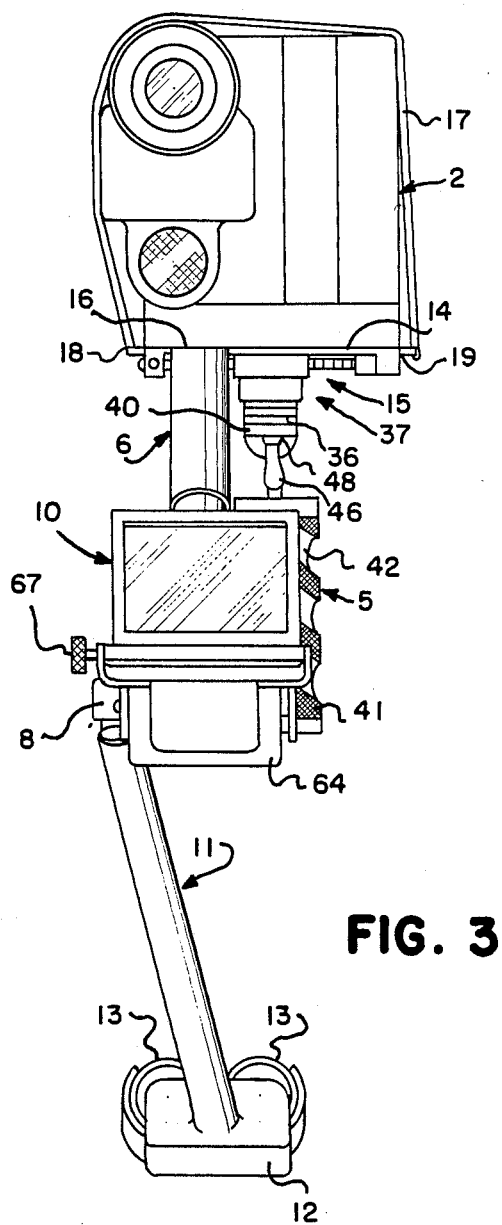
FIGS. 3 and 4 are end views of the stabilized camera support of FIG. 1, taken from the front and rear of the unit, respectively.
Figure 4:
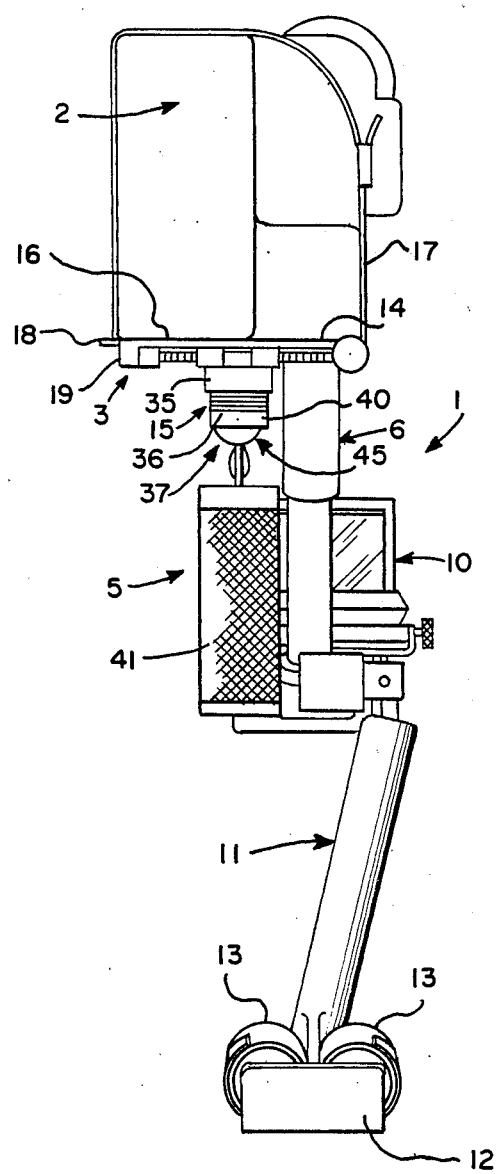
Figure 5:
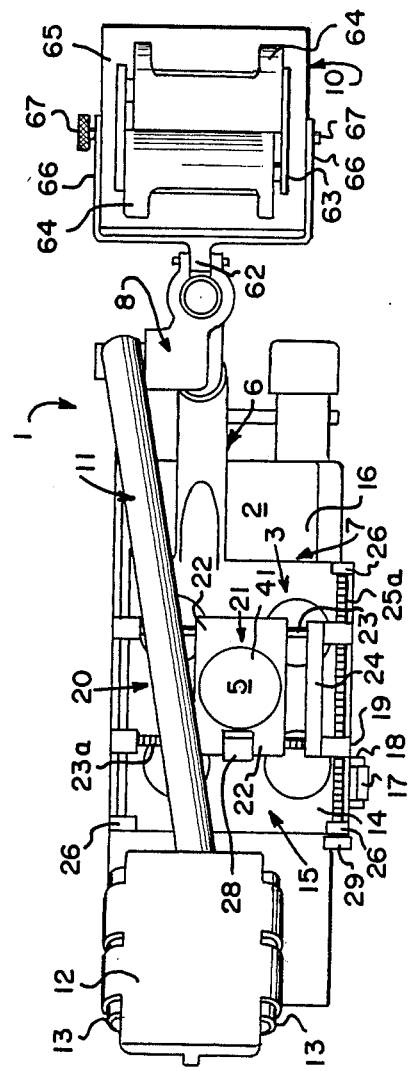
FIG. 5 is a bottom plan view of the stabilized camera support of FIG. 1.
Figure 6:
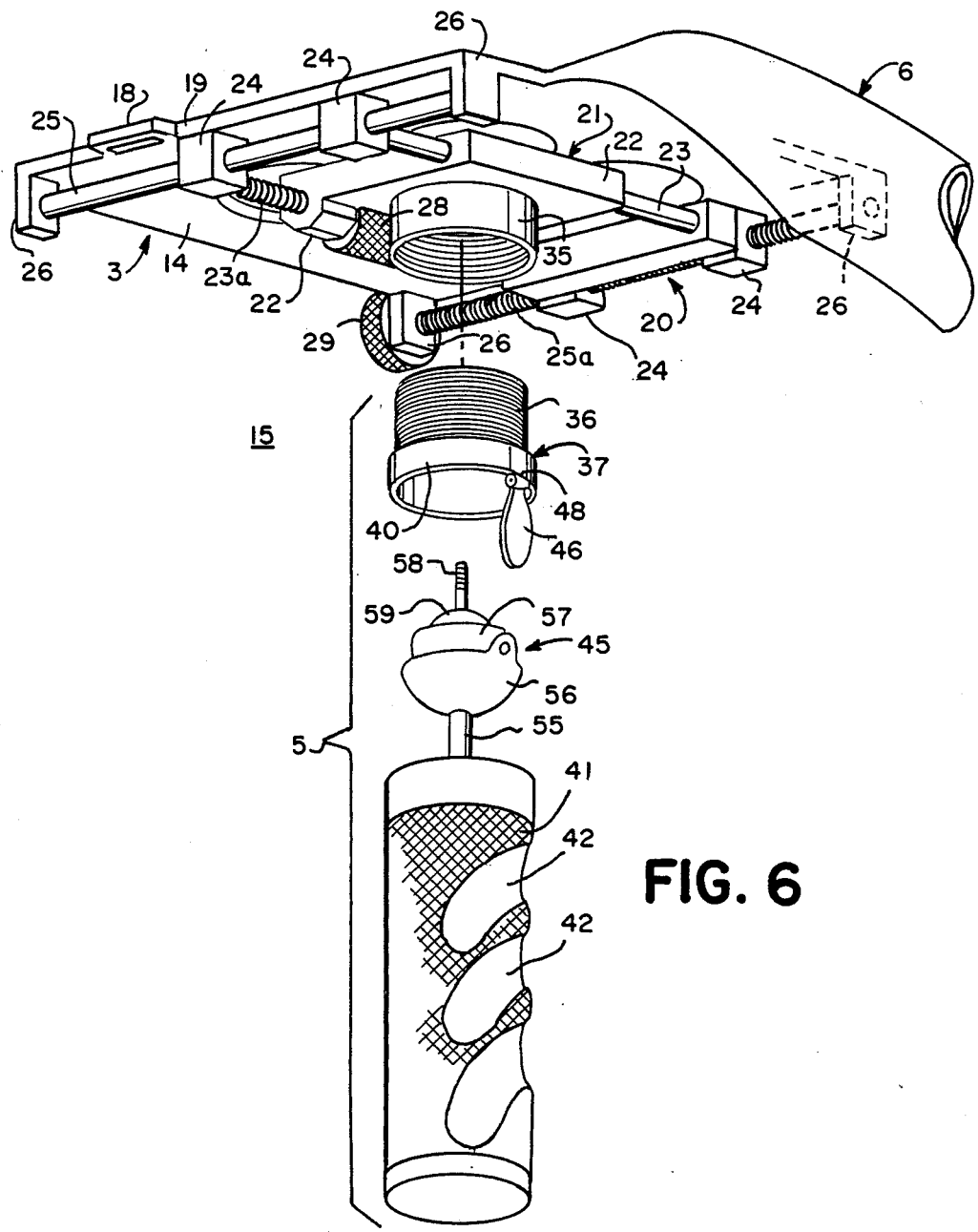
FIG. 6 is an exploded, isometric view of the platform and handle of the stabilized camera support of FIG. 1.

Referring generally to FIGS. 2 to 4, and with particular reference to FIGS. 5 and 6, the platform 3 is generally comprised of an equipment receiving surface 14 and an adjustment mechanism 15 for establishing the appropriate relationship between the platform 3 and the handle 5 as will be described more fully below. The surface 14 is generally planar and adapted to receive the base 16 of the camera 2, and is preferably provided with a friction producing surface (e.g., roughened or fabric coated) to reduce the potential for movement of the camera 2 upon the surface 14 during use of the apparatus. A strap 17 extends from mounting brackets 18 formed in opposing side edges 19 of the platform 3, and is adapted to extend over the camera 2 to securely retain the camera 2 to the surface 14 of the platform 3. This results in an easily and quickly produced, yet secure mounting for the camera 2. As will become apparent from the description which follows, the adjustment mechanism 15 operates to readily accommodate variations in camera type, as well as variations in placement of the camera 2 upon the surface 14 of the platform 3, thus avoiding the need for a particularly careful placement of the camera 2 and simplifying use of the stabilized camera support 1.

The adjustment mechanism 15 generally takes the form of an x-y table 20 disposed beneath the platform 13. To this end, a table 21 is provided with bearings 22 for receiving a pair of rods 23 extending laterally between a pair of sliding blocks 24, providing for lateral movement of the x-y table 20. The sliding blocks 24, and accordingly the table 21, are further received upon a pair of rods 25 which extend between fixed mountings 26 formed in and extending from the platform 3, providing for longitudinal movement of the x-y table 20.

One of the laterally extending rods 23a is threaded, and operates in combination with a knurled adjustment screw 28 to permit adjustment of the lateral positioning of the x-y table 20, and accordingly, lateral adjustment of the handle 5 as will be described more fully below. One of the longitudinally extending rods 25a is similarly threaded and operates in combination with a knurled adjustment screw 29 to permit adjustment of the longitudinal positioning of the x-y table 20, and accordingly, longitudinal adjustment of the handle 5 as will be described more fully below. It will be understood that the pitch of the threads on the rods 23a, 25a will be sufficiently fine so that the adjustments, once set, will not unintentionally change in the course of using the apparatus.

The table 21 is further provided with a threaded bushing 35 for receiving the handle 5 of the stabilized camera support 1 by means of a series of threads 36 associated with a terminating end 37 of the handle 5. Rotation of the threaded end 37 within the bushing 35 therefore operates to provide a third degree of adjustment, in addition to the adjustments afforded by the x-y table 20, permitting full adjustment of the stabilized camera support 1 along three mutually perpendicular axes.

As previously indicated, stabilization of the camera support 1 is accomplished by adjustment of the unit to appropriately position its center of gravity for stabilized operation. This center of gravity is established, outside of the camera 2, by the expanded, balanced arrangement of the various components comprising the camera support 1; in particular, the platform 3 and camera 2, the view finding device 10, and the battery holder 12. Adjustment of the handle 5 with respect to this center of gravity is accomplished by varying the longitudinal and lateral placements of the x-y table 20, and the extension of the handle 5 within the bushing 35, as will be described more fully below.

The handle 5 is generally comprised of two discrete, isolated handle portions. One portion of the handle 5 is constituted by the threaded end 37 which is received by the bushing 35 of the x-y table 20, and includes a control surface 40 which is adapted to be grasped by the operator, preferably using the thumb and index finger, for use in orienting the stabilized camera support 1 as will be described more fully below. The other portion of the handle 5 is constituted by a grip 41 having notches 42 for receiving the remaining fingers of the operator's hand, to provide primary support for the stabilized camera support 1.

Figure 7:
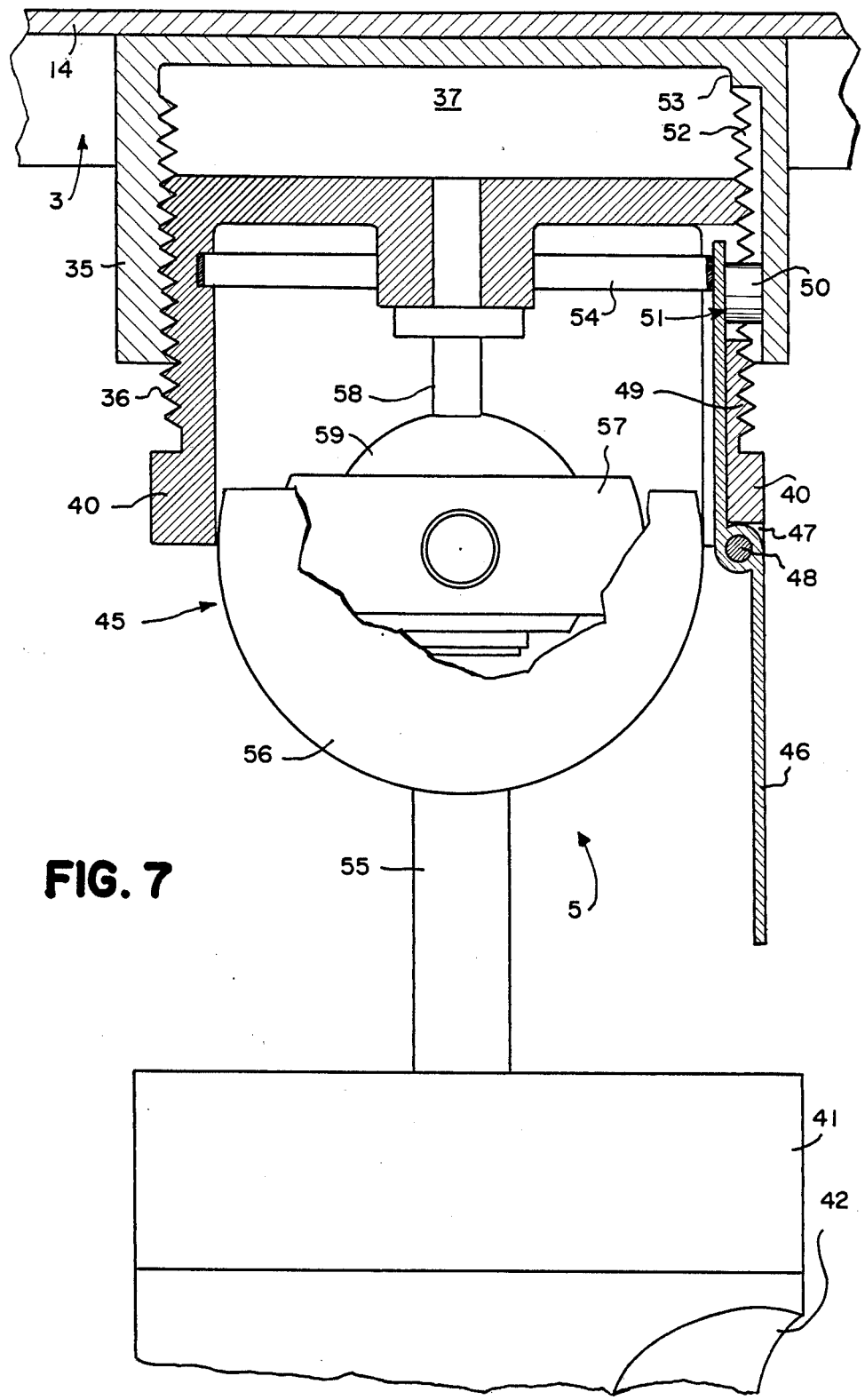
FIG. 7 is an enlarged, elevational view of the structures illustrated in FIG. 6, with portions broken away to reveal the gimbal which separates the handle sections and a mechanism for adjusting the balance of the resulting unit.

Any of a variety of devices may be used to connect the grip 41 and the end 37 of the handle 5, provided the selected mechanism is capable of isolating angular movements. The device selected for illustration in the drawings is a gimbal 45, as is preferred in accordance with the present invention, although other types of isolating mechanisms (e.g., ball and socket arrangements) can also be used for this purpose. As is best illustrated in FIG. 7 of the drawings, the gimbal 45 is configured to provide angular isolation in three mutually perpendicular directions, and is specially configured to be sufficiently small to fit between the grip 41 and end 37 of the handle 35 so as to poise the "head" of the stabilized camera support 1 upon a gimbal which is sufficiently small to avoid interference with the use of the device by the operator. Thus, the gimbal 45 is sufficiently small to fit within the confines of the end 37 of the handle 5, in essence developing what can be considered to be a split or interrupted handle comprised of the handle portions 37, 41 and the gimbal 45.

This "interrupted handle" operates in accordance with the present invention to effectively separate the functions of lifting and orienting the stabilized camera support 1 and camera 2, even when held by only a single hand. The unit is easily supported by grasping the lower section or grip 41 of the handle 5 with the middle, ring and little fingers of the hand, providing adequate support for the unit, and facilitating transport of the assembly. The notches 42 of the grip 41 operate to assist in support of the unit, as well as to properly position the hand of the operator upon the handle 5 in relation to the remainder of the unit. To be noted is that this lower section remains in angular isolation from the upper end 37 of the handle 5, so that the supported equipment remains virtually isolated from unwanted angular movements of the operator in the course of these support functions.

The end 37 of the handle 5 incorporates a relatively small, yet conveniently placed control surface 40 which can be lightly grasped by the thumb and index finger of the same hand (or of the other hand if desired), and preferably surrounds approximately the upper 50% of the gimbal 45, in annular fashion. This operates to avoid interference between the gimbal 45 and the remainder of the handle 5, as well as with the hands of the operator, and develops a limited (minimal) control surface which can be lightly grasped to orient the stabilized camera support 1, and accordingly the camera 2, in the course of its operation. This minimal control surface 40 need only be grasped intermittently, as needed to orient the camera 2 and the stabilized camera support 1 which receives it, and need not be grasped at all times. Thus, a minimal control surface is provided which assures that contact between the thumb and index finger of the operator's hand and the control surface 40 is limited (i.e., minimally oriented) to prevent conveying undesired movements to the unit in the course of these guiding functions. A tongue 46 additionally extends from forward portions of the end 37 of the handle 5, to provide an additional control surface for directing the stabilized camera support 1, if necessary, and to provide additional versatility in achieving appropriate interaction between the hand of the operator and the handle 5 of the stabilized support 1, as will be discussed more fully below.

As previously indicated, an important aspect of the stabilized camera support 1 of the present invention is the ability to adjust the location of the handle 5 with respect to the center of gravity for the unit, which is made accessible by the expanded, balanced arrangement of the stabilized camera support 1 (and the camera 2). This adjustment is generally accomplished using the x-y table 20 and the threaded extension of the end 37 of the handle 5 within the bushing 35, which combine to provide a three-axis vernier calibration of the relative spatial position of the handle 5 and the remaining portions of the stabilized camera support 1 in order to permit fine control over the balanced attitude and degree of bottom-heaviness (the vertical axis perpendicular to tilt and roll) of the resulting mass. To this end, three adjustments are provided.

Transverse adjustment of the x-y table 20, which is accomplished by rotation of the knurled adjustment screw 28, and longitudinal adjustment of the x-y table 20, which is accomplished by rotation of the knurled adjustment screw 29, is performed to in essence align the center of gravity of the assembled unit with the longitudinal axis of the end 37 of the handle 5, and accordingly, the control surface 40. This establishes a level, balanced placement of the camera 2 upon the stabilized camera support 1, as is preferred. To be noted is that this adjustment will assist in accommodating both variations in the configuration of the camera 2, as well as variations in the camera's placement upon the platform 3 of the stabilized camera support 1, as previously discussed.

Proper adjustment of the x-y table 20 will therefore place the center of gravity of the assembled unit along the axis (z-axis) defined by the end 37 of the handle 5 of the unit (and the control surface 40). It then remains to adjust the position of this center of gravity along the length of the handle 5, by adjusting the threaded engagement between the end 37 of the handle 5 and the bushing 35 of the x-y table 20. This adjustment is preferably accomplished to place the center of the gimbal 45 approximately 1/16 of an inch above the center of gravity, so that the resulting unit is slightly bottom-heavy (tending to slowly return to a stabilized, normal orientation). This, combined with the close positioning of the control surface 40 of the handle 5 (and the gimbal 45) to the underside of the platform 3, has been found to be particularly important in assuring a controlled operation of the stabilized camera support 1, and in reducing the overall size of the device.

An exemplary procedure for trimming the stabilized camera support 1, making use of the above-described x-y table 20 and its threaded connection (bushing 35) for the handle 5, will now be described. The unit is first deployed to assume the expanded balanced arrangement shown in FIGS. 1–5, including mounting of the camera 2 and the batteries 13, 64, as appropriate. The assembled unit is then held by the grip 41, to determine which way it hangs (lens up or down, batteries up or down, unit to either side). In the event that the camera 2 hangs upside down, a discrete weight or weights can be placed on the battery holder 12 (or elsewhere, if preferred, such as on the camera 2) to ensure that the camera 2 is bottom heavy, and hangs right side up. If the lens tends to point up or down, or the camera leans to either side, the camera 2 can be shifted upon the platform 3 to assume a generally upright orientation. The strap 17 should then be tightened to maintain this initial positioning.

The adjustment screws 28, 29 are then turned for a vernier adjustment of the x-y table 20, to cause the camera 2 to sit level upon the gimbal 45. Following this, an adjustment in the z-axis is performed. To this end, the unit is supported by the grip 41, and raised up to a generally horizontal orientation. The unit is then released from this horizontal placement, and the amount of time which it takes for the unit to fall through its vertical position is measured. This should take about 2 to 3 seconds, with 2.5 seconds being preferred (which generally corresponds to a preferred placement of the center of gravity about 1/16 of an inch below the center of the gimbal). If this measured period is less than one second, it may be necessary to reduce the weight (or weights) which may have been attached to the battery holder 12, or elsewhere, earlier in the adjustment procedure. Otherwise, an appropriate adjustment in the z-axis is then performed by rotating the end 37 of the handle 5 within the bushing 35 of the x-y table 20. In any event, a re-adjustment of the x-y table 20 may then be needed, since these adjustments will become much more critical as the bottom heaviness of the unit is reduced. Further (fine) adjustment of the unit may then proceed, as needed, by alternating adjustments in the z-axis and of the x-y table, as previously described, until the unit falls through its vertical position (from the horizontal) in the desired 2.5 second interval. Once adjusted, only minor re-adjustments should then be needed to tune the unit, so long as the camera 2 remains attached to the stabilized camera support 1.

To be noted is that the above-described adjustments should be kept relatively small, since they are extremely important in assuring proper operation of the stabilized camera support 1. For this reason, the threads of the rods 23a, 25a, as well as the threads of the bushing 35 and the end 37, are preferably kept rather fine to provide this needed degree of accuracy in adjustment. However, gross adjustments are also easily performed by fore and aft, as well as lateral movement of the camera 2 upon the platform 3. A gross adjustment of the bottom-heaviness of the unit is achievable by attaching small weights to different portions of the structures which comprise the stabilized camera support 1, if desired.

Also noteworthy in connection with this adjustment procedure is the tongue 46 of the handle 5. As previously indicated, the tongue 46 primarily operates to provide an added control surface for the operator, in addition to the control surface 40 of the handle 5, and extends below and in front of the mid-point of the gimbal. This positions the tongue 46 so that the thumb and index finger of the operator's hand can straddle the center of gravity of the unit, offering a slightly increased surface which is particularly useful for tilting of the camera 2, either up or down, or in panning the camera, either left or right. However, even with the added surface offered by the tongue 46, it is to be noted that the tongue 46 and the control surface 40 of the upper end 37 of the handle 5 are both sized and proportioned to prevent excessive leverage from being applied to the system by the operator's thumb and index finger so that even the small moment of rotational inertia offered by the system will nevertheless remain proportionately the largest prevailing force acting upon the angular orientation of the unit.

Figure 8:
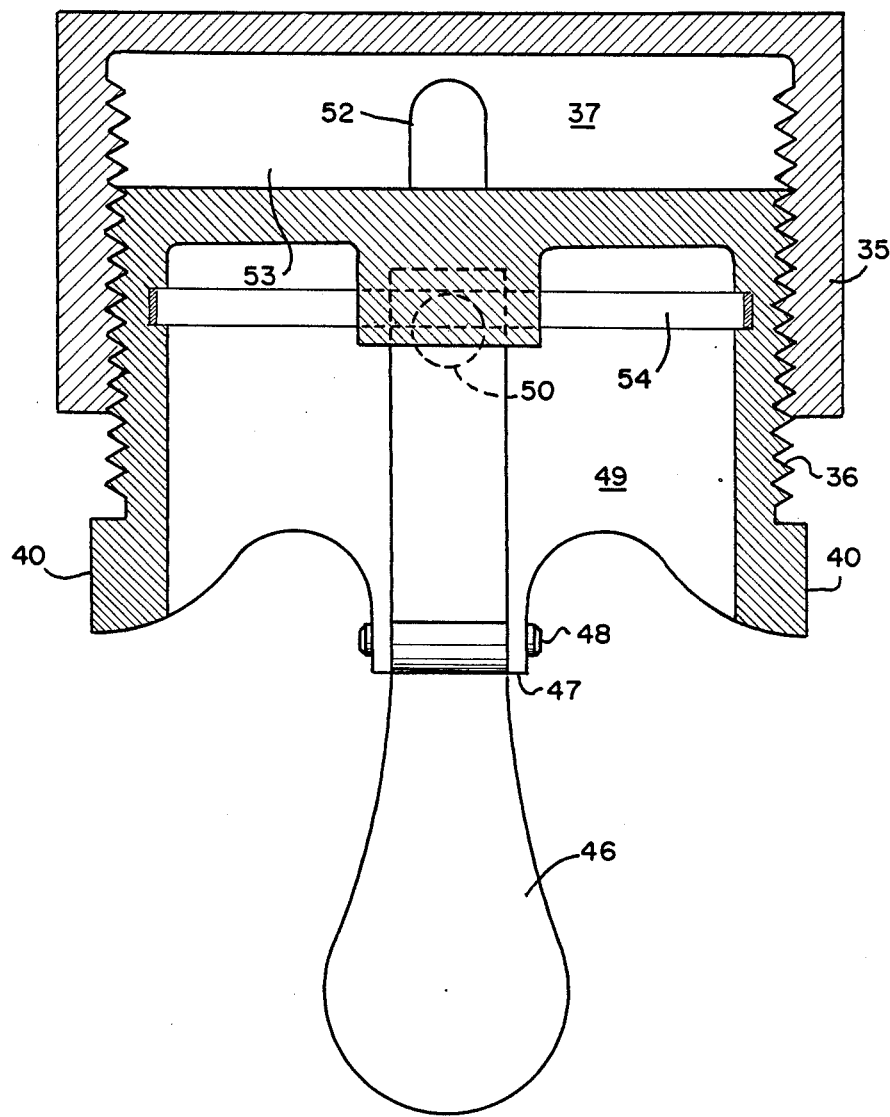
FIG. 8 is a cross-sectional view of upper portions of the handle for the stabilized camera support, further illustrating the balance-adjusting mechanism.

Referring to FIGS. 7 and 8, it is seen that the tongue 46 preferably provides an added function of maintaining the adjustment of the longitudinal extension of the handle 5 from the platform 3, once set. This is particularly important since this adjustment will tend to vary (unlike the adjustment of the x-y table 20) as a result of continued panning and tilting of the camera 2 in the course of its operation. To accomplish this, the tongue 46 is pivotally associated with the rim 47 (at the pivot 48) of the end 37 of the handle 5 at its forward most end, extending longitudinally along the inner wall 49 of the end 37 of the handle 5, and terminates in a locking pin 50. An aperture 51 is provided for receiving the locking pin 50, and permits the locking pin 50 to extend into a slot 52 which is formed along the inner wall 53 of the bushing 35 of the x-y table 20. A leaf spring 54 is provided for urging the locking pin 50 into the slot 52 of the bushing 35, and to normally maintain the tongue 46 in its desired position (extending longitudinally from the handle 5) for effective engagement by the operator.

In the event that an adjustment (in the Z-axis) of the handle 5 (within the bushing 35 of the x- table 20) becomes necessary, this is readily accomplished by applying a radially outwardly directed force to the tongue 46, overcoming the leaf spring 54 and withdrawing the locking pin 50 from the longitudinally extending slot 52. This permits the end 37 of the handle 5 to rotate within the bushing 35, adjusting the longitudinal extension of the handle 5 as previously described. Once this adjustment is completed, the tongue 46 is released, returning the locking pin 50 to the slot 52, preventing further respective rotation between the end 37 and the bushing 35, and maintaining the desired adjustment. To be noted is that the slot 52 is specifically located along forward most portions of the bushing 35, to assure that the tongue 46 always resumes its forward most position in the handle 5 to provide the control surface which is desired for effective tilting and panning of the camera 2 as previously described. While this also limits the available positionings for the end 37 of the handle 5 within the bushing 35, limiting the available adjustments for the handle 5 to one increment per discrete (full) rotation, it has been found that these available adjustments are more than sufficient to achieve an appropriate balance of the resulting unit.

As previously indicated, an important factor contributing to the control afforded by the stabilized camera support 1 of the present invention is that the control surfaces are placed as closely as possible to the underside of the platform 3 which receives the camera 2. This, as well as the improvements afforded by the interrupted handle 5 of the present invention, is permitted by the miniaturized gimbal 45 which is used to separate the handle portions 37, 41. Indeed, as previously indicated, the gimbal 45 is sufficiently small to fit within the confines of the end 37 of the handle 5, and its control surface 40. The gimbal 45 is supported by a shaft 55 which extends from the grip 41, along its longitudinal axis, and which receives the outer yoke 56 of the gimbal 45. Resulting from operation of the gimbal 45, the shaft 55 (and the grip 41) is in essence coupled to the end 37 of the handle 5, in rotative fashion.

Figure 9:
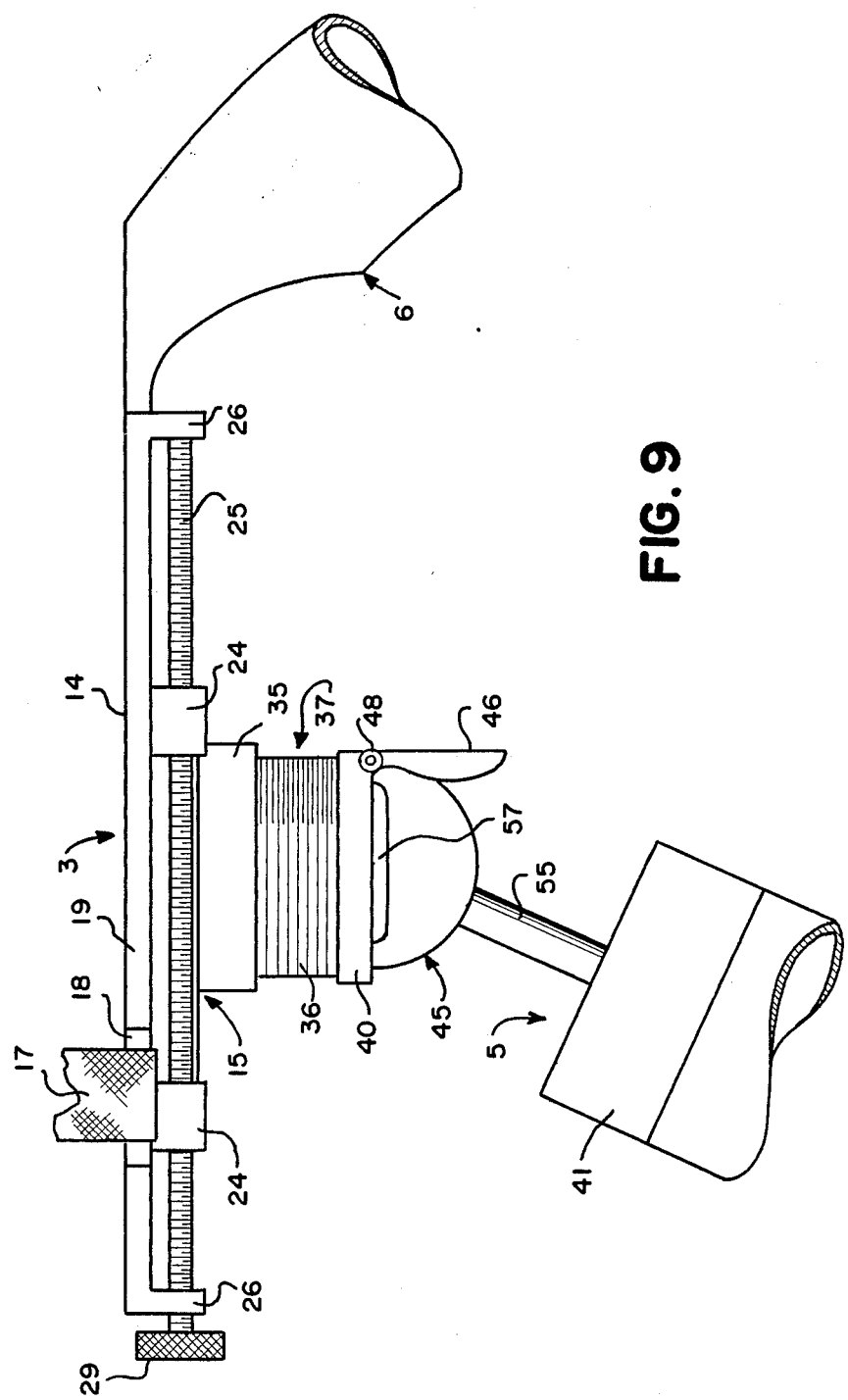
FIG. 9 is a partial, elevational view of the platform and handle of the stabilized camera support, showing an alternative embodiment gimbal configuration.
Figure 10:
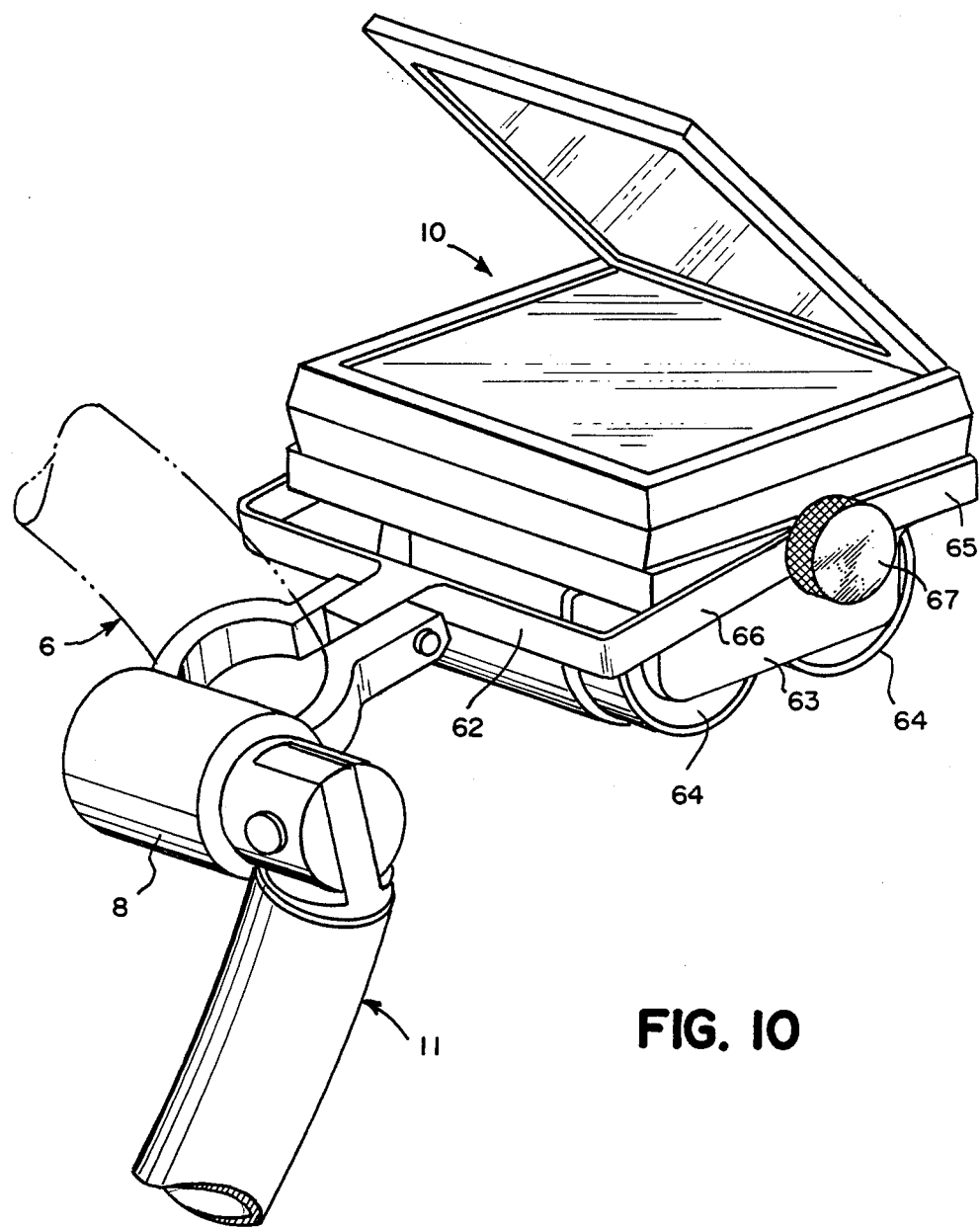
FIG. 10 is an enlarged isometric view of the view finding device of the stabilized camera support of FIG. 1.

It will be noted that as the grip 41 of the handle 5 is raised upwardly, the potential exists for the intermediate ring 57 to come into contact with the shaft 58 which extends from the inner ball 59 of the gimbal 45, giving rise to two potential obstructions separated by approximately 90° of rotation in the grip 41. While this is minimized by effectively locating the grip 41 with respect to the end 37 of the handle, and accordingly the gimbal 45, through an effective placement of the notches 42 formed in the grip 41, it is possible to still further eliminate the potential for such obstructions by modifying the orientation of the grip 41 relative to the gimbal 45, as illustrated in FIG. 9 of the drawings.

To this end, the shaft 55 is offset with respect to the yoke 56 of the gimbal 45, generally on the order of 20-30 degrees, so that the grip 41 is affixed to one side of a symmetrically centered position for the gimbal's yoke 56. This operates to further prevent contact between the gimbal's center ring 57 and the shaft 58 which receives the inner ball 59, by ensuring that the major arc of the yoke 56 is aligned toward the notches 42 which are provided in the grip 41 of the handle 5. This arrangement provides for the maximum unobstructed arc of freedom for the supportive portion (the grip 41) of the handle 5 relative to the orienting portion (the end 37) of the handle 5. What is more, this operates to position the only potential obstructions between the portions 37, 41 of the handle 5 (i.e., the points of contact between the intermediate gimbal ring 57 and the shaft 58 which extends from the inner ball 59 of the gimbal 45) in attitudes which are generally not useful to the operator and which therefore will not be approached by the operator during normal usage of the apparatus. In any event, if the grip 41 is grasped by the notches 42, the hand of the operator is automatically and effectively positioned to avoid these potential obstructions.

The significant freedom afforded by the interrupted handle 5, and the expanded, balanced arrangement afforded by the struts 6, 11 which interconnect the various portions of the stabilized camera support 1, operate to provide a clear and unimpeded "access" to the gimbal 45 along a significant region. In the horizontal plane, access for the operator's arm is available along an arc of about 340°. In the vertical plane, such access is available from a level position to a position about 70° below the vertical, to the rear of the unit, and from a level position to a position about 85° below the vertical, for the remainder of the handle's horizontal travel. Accordingly, the supporting hand of the operator (holding the grip 41) can access the gimbal 45 from level positions to a position directly below the gimbal, which is comfortable to the operator and which permits the wrist of the operator to be placed in the strongest and most natural position for supporting the resulting load.

What is more, the improved component placement of the present invention serves to place the center of gravity of the camera 2 to the rear of the gimbal 45 (the axis of the end 37), which serves to reduce the amount of "precession" which will be experienced during rapid panning of the camera 2 as is presently recognized in connection with the operation of professional stabilized camera supports. Such precession can occur when the component placements which are provided develop a dynamically balanced axis which is different from the axis of the handle. The result is an unintended wobble of the resulting structure toward the true axis of the system, when panning forces are applied around the structural axis of the unit. However, the structure of the stabilized camera support 1 of the present invention provides a component placement which is in approximate static and dynamic balance along the axis which is concentric with the end 37 of the handle 5, and which is therefore perpendicular to the axis which is concentric with the lens or aperture of the camera 2. To this end, the struts 6, 11 are preferably configured to develop opposing, convex arcs which position the view finding device 10 forward and below the camera 2, and the battery holder 12 below and to the rear of the camera 2, but preferably not further rearward than the rear end of the camera 2 itself, so that the center of gravity of the camera 2 is significantly rearward of the gimbal 45, as is preferred.

The stabilized camera support 1 incorporates a variety of convenient features which facilitate its use in varying modes of operation, as well as its storage. One important aspect of this is the provision of a view finding device 10 which eliminates the need for the operator to directly address the viewfinder of the camera 2, which would tend to introduce not only inconvenience, but undesirable movements of the camera 2. Any of a variety of available view finding devices may be used for this purpose. However, the placement of the selected view finding device 10 is important not only to assure the proper expanded, balanced relationship for the stabilized camera support 1, but also to assure that the view finding device 10 is readily viewed by the operator of the system in the course of its use. Placement of the view finding device 10 forward of the camera 2, at the mounting 8 as shown, has been found to be preferred in this regard.

To facilitate this mounting, a fork 62 extends from the mounting 8, for receiving both the view finding device 10, and a battery holder 63 for receiving batteries 64 for operating the view finding device 10. The view finding device 10 and the battery holder 63 are preferably mounted to a plate 65 which is engaged by and pivotable between the opposing ends 66 of the fork 62, for convenient access by the operator. To be noted is that this mounting configuration permits the operator to adjust the position of the view finding device 10, as desired, without altering the overall balance of the stabilized camera support 1. Of course, necessary electrical interconnections for the camera 2, the view finding device 10, the battery holder 63, and the battery bolder 12 are provided as needed, and are advantageously received in protected fashion within the struts 6, 11 which extend between these various structures.

Figure 11:
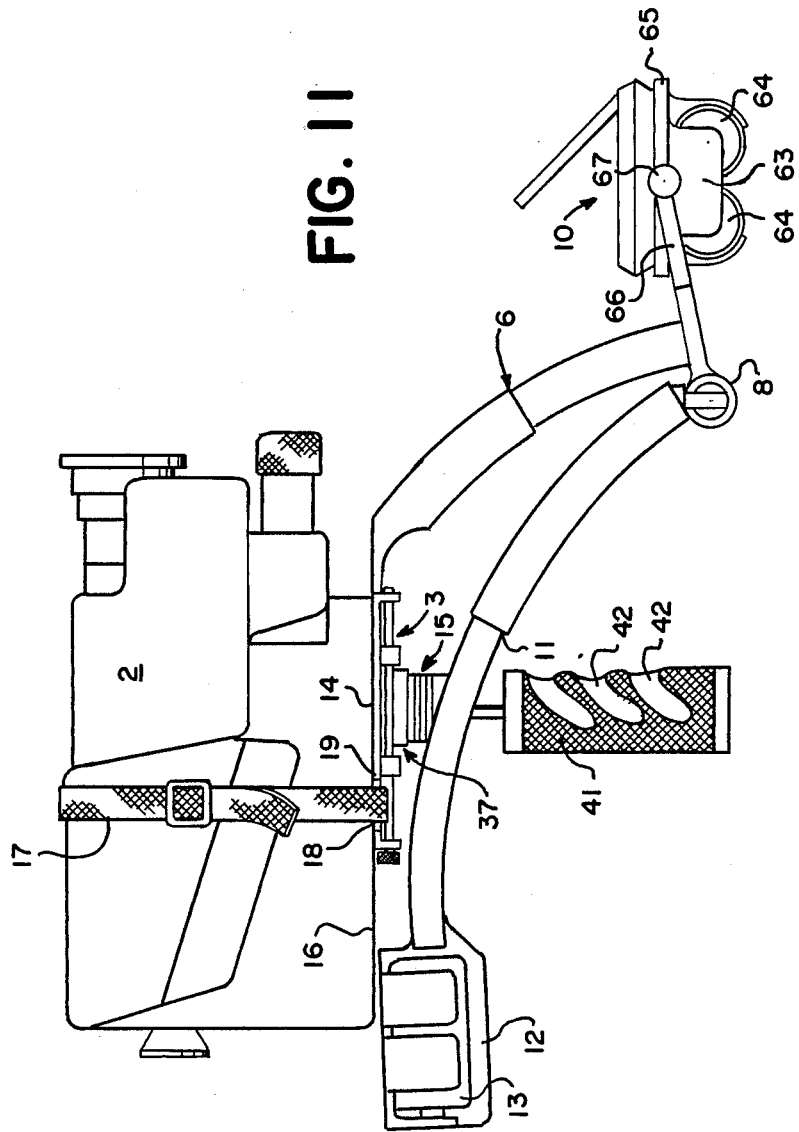
FIG. 11 is a side elevational view of the stabilized camera support, shown folded in a position adapted for operation of the unit "on-the-shoulder".

Yet another convenience for the operator is to be able to modify the configuration for the stabilized camera support 1 from the expanded, balanced arrangement which is useful for isolated operation of the camera 2, as previously described, to a configuration which enables the camera 2 to be operated "on-the-shoulder". As is best illustrated in FIG. 11, this is accomplished by providing a swivel joint 67 at the mounting 8 so that the strut 11 can be rotated from the position which is shown in FIG. 2 of the drawings to the position which is shown in FIG. 11. This rotates the strut 11 upwardly, about a horizontal axis defined by the swivel joint 67, to a position in which the battery holder 12 is placed just beneath the camera 2, providing a comfortable and convenient shoulder support for the resulting assembly.

The struts 6, 11 can be formed from any of a variety of materials, and are appropriately attached to the platform 3, mounting 8 and holder 12 in a fashion which is convenient (including separate as well as integral assemblies) depending upon the materials which are used. For example, metal tubes (e.g., aluminum) may be used to form the struts 6, 11. Alternatively, plastics may be used, or even composite materials such as graphite, depending upon various cost and weight considerations. It is even possible for the struts 6, 11 to be formed as assembled or integral structures extending from, or even formed as part of, the camera 2, if desired. In any event, it is preferable for the struts 6, 11 to be formed as telescoping inner (6a, 11a) and outer (6b, 11b) sections, to permit the stabilized support 1 to be folded and retracted in a manner which develops a unit of minimal size for purposes of storage. In this regard, it is important to keep in mind that the configuration for the struts 6, 11 is carefully selected to maintain the expanded, balanced arrangement which is necessary for proper operation of the stabilized camera support 1. This necessarily requires that a proper extension of such telescoping strut sections be established when the apparatus is to be placed in use. For this purpose, the struts 6, 11 are advantageously provided with an appropriate detent arrangement (e.g., a circumferential band and ring combination, a pin and groove arrangement, etc.) to automatically establish this positioning when the unit is opened from its folded storage configuration.

It will therefore be seen that the stabilized camera support 1 of the present invention serves well to satisfy each of the objectives previously set forth. It will further be understood that the stabilized camera support 1 which has been described is a preferred embodiment, and may be varied without departing from the spirit and scope of the present invention. Some of these variations have been discussed in the course of describing the preferred embodiment. Particularly noteworthy in this regard is that a variety of different isolation devices may be used, other than the gimbal 45 which is described. Other types of gimbals may be used, as well as other types of isolation devices such as ball joints and the like.

Also to be noted is that a variety of adjustments have been provided to accommodate variations within the system, particularly relating to camera type and placement of the camera upon the platform 3 of the stabilized camera support 1. This is preferred to accommodate different cameras and facilitate the set up of what is essentially a universal support system. However, it is equally possible for the platform 3 to be specifically configured to receive a specific type of camera 2, in a preestablished position, permitting elimination of some of the previously described adjustment procedures. In the event that there are to be no variations in the components of the system, such as if the device were custom manufactured in its entirety, it would be possible to eliminate some or all of these adjustments, including the x-y table 20 previously described in connection with trim of the apparatus, and even including the adjustment for bottom heaviness, but only if the device were custom manufactured with extreme precision and never damaged in use.

Other variations are clearly possible. For example, the preferred embodiment handle 5 incorporates a tongue 46 which is pivotally associated with the end 37 of the handle 5 to secure and maintain height adjustments of the handle 5, once set. While this is preferred, it is also possible to provide the end 37 of the handle 5 with a fixed tongue which provides the handle 5 with the same orienting functions as the tongue 46, but which is simplified in terms of its construction, or even to delete the tongue 46 from the handle 5, if desired. Variations are also possible in connection with the x-y table 20, and the threaded fitting 35 which it incorporates, which may be modified in their configuration or placement within the apparatus, or even replaced with other mechanisms for adjusting the position of the handle 5 relative to the remainder of the stabilized camera support 1. Also capable of variation are the mountings for the view finding device 10 and the battery holders 12, 63, so long as an appropriately expanded, balanced arrangement is maintained for the stabilized camera support 1, and the means which are used to secure the camera 2 to the platform 3, apart from the strap 17 which is provided for this purpose in the preferred embodiment.

Figure 12:
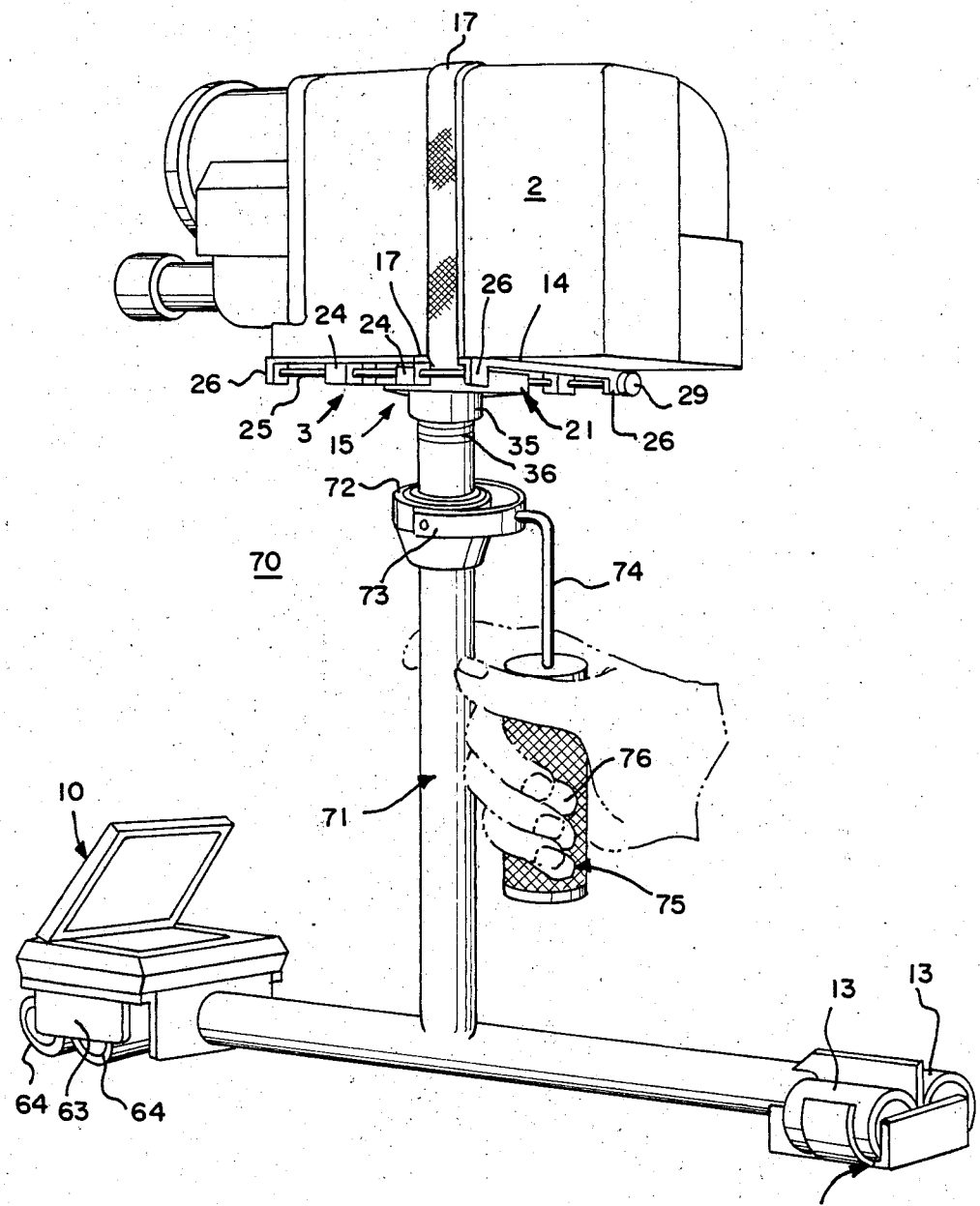
FIGS. 12 and 13 are perspective views of alternative embodiment stabilized camera supports produced in accordance with the present invention.

FIG. 12 illustrates an alternative embodiment stabilized camera support 70 which makes use of a different handle and support configuration for providing the improvements of the present invention. In this configuration, the camera 2, the view finding device 10 and the battery holder 12 are supported in an appropriately expanded, balanced arrangement by a T-bar 71 which is configured to receive these various components so that the center of gravity of the resulting unit is positioned approximately 1/16 of an inch below the supporting gimbal 72, as is generally preferred. This can be accomplished either by manufacturing a T-bar which is specifically configured for the components which it is to receive, or by providing the T-bar with telescoping segments which can adjustably accommodate different operating conditions and trim requirements (x-y trim is assisted by movement of the camera 2 upon the platform 3, while trim along the z-axis is accomplished by adjusting the location of the gimbal 72 along the length of the T-bar 71).

The gimbal 72 is of a configuration similar to that disclosed in my U.S. Pat. Nos. Re. 32,213; 4,208,028; and 4,474,439, which are incorporated by reference as if fully set forth herein. The outer ring 73 of the three-ring gimbal 72 receives a connecting shaft 74 which terminates in a grip 75. As with the grip 41 of the handle 5, the grip 75 is also provided with notches 76 for receiving the middle, ring and small fingers of the hand so that the operator's hand is properly placed upon the grip 75. Again, this frees the thumb and index finger for grasping the T-bar 71, providing the orienting functions which are necessary for effective operation of the camera 2. Thus, the stabilized camera support 70 is again capable of being supported and oriented by a single hand, in a comfortable and convenient fashion.

Figure 13:
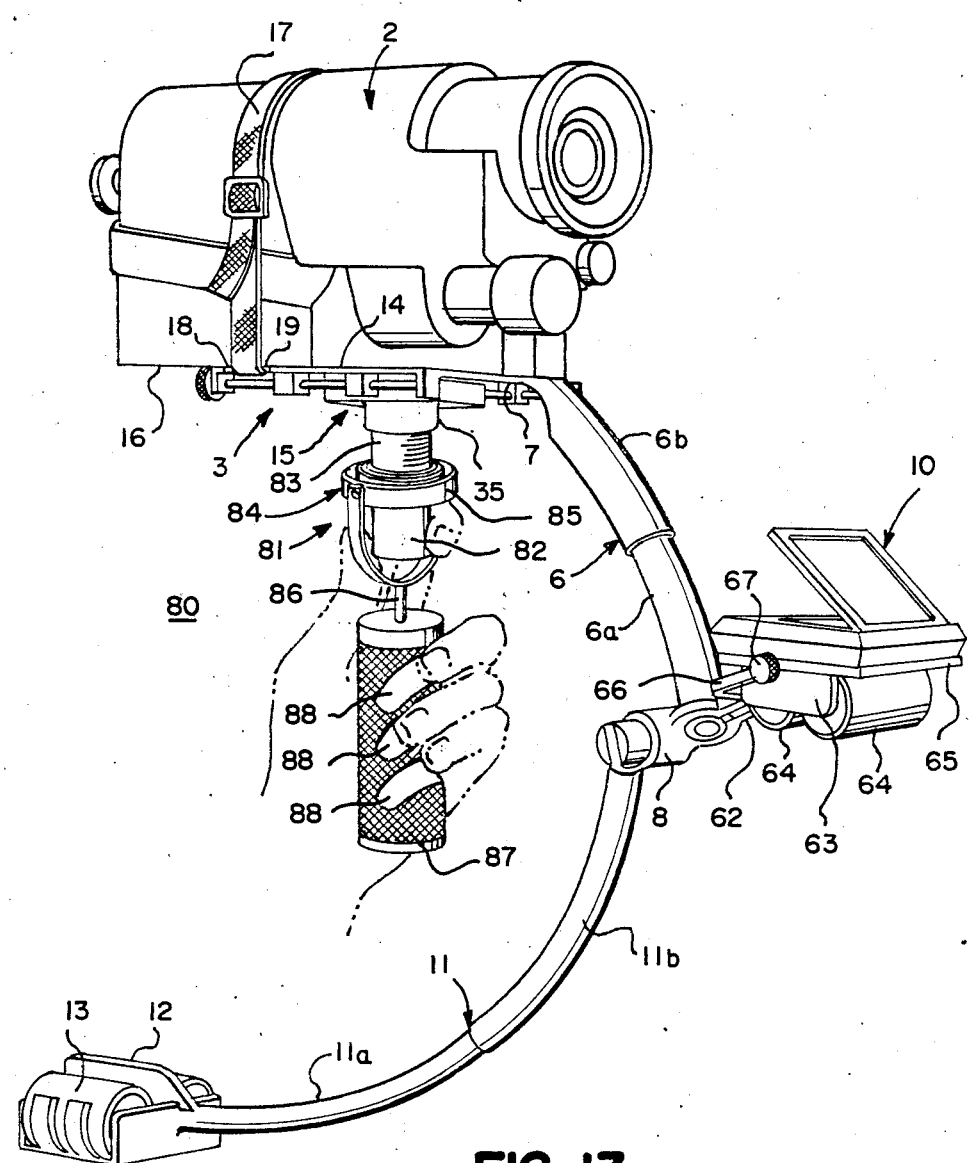

While providing an effective means for stabilized support of the camera 2, the camera support 70 is presently considered less preferred since the gimbal 72 will generally be spaced farther from the platform 3 due to the spatial requirements of its three-ring (three-axis) configuration, and since the grip 75 will generally assume a less ergonomically satisfactory position in the course of its use. However, such a configuration would prove to be of increasing usefulness as available cameras become progressively lighter in construction. Nevertheless, FIG. 13 illustrates a stabilized camera support 80 which employs aspects of the camera support 1, in combination with a handle 81 which is similar in many respects to that of the stabilized camera support 70, yet which is more ergonomically suited to the user.

The stabilized camera support 80 for the most part corresponds to the stabilized camera support 1, except for its handle 81, which replaces the handle 5. As shown, the handle 81 includes a shaft 82 having an end 83 which threadingly engages the platform 3, and which (adjustably) receives a gimbal 84 which corresponds in structure to the gimbal 72 of FIG. 12. The outer ring 85 of the gimbal 84 again receives a shaft 86 which connects the gimbal 84 with a grip 87 having notches 88 for correctly placing the hand of the operator upon the handle 81. However, in this embodiment, the shaft 82 and the grip 87 are positioned in general alignment with one another so that the hand of the operator assumes an ergonomically preferred orientation which is similar to that of the handle 5. The grip 87 again serves to provide support for the resulting unit, and to transport the camera 2 as desired, and is again advantageously grasped by the middle, ring and little fingers of the user's hand. The shaft 82 is again advantageously positioned to be grasped by the thumb and index finger of the user's hand, in this case below the gimbal 84, for appropriate orientation of the camera support 80 and the camera 2 which it supports.

It will therefore be understood that various changes in the details, materials and arrangement of parts which have been herein described and illustrated in order to explain the nature of this invention may be made by those skilled in the art, based upon the principles set forth in accordance with the present invention, as expressed in the following claims, including any equivalent implementations for performing substantially the same function in substantially the same way to obtain the same result, whether presently known or which may come to be known.

What is claimed is:

1. An equipment support which is capable of being hand-held with improved stability against angular deviations in pan, tilt and roll to isolate equipment for use with said equipment support, including equipment to be oriented and equipment associated with said equipment to be oriented, from unwanted angular movements caused by motion of the equipment support when in use, comprising:

equipment support means for receiving said equipment in an expanded, balanced arrangement which provides an accessible center of gravity; and handle means for engagement by at least one hand of an operator and for attachment to said equipment support means to access said center of gravity, including a gripping portion for supporting and transporting the weight of said equipment and said equipment support means, and an orienting portion for orienting said equipment to be oriented, coupled by means for isolating said orienting portion from unwanted angular movements of said gripping portion caused by movements of said handle means.

2. The equipment support of claim 1 wherein said equipment to be oriented is a camera.

3. The equipment support of claim 2 wherein said camera is a self-contained, portable video camera/recorder.

4. The equipment support of claim 3 wherein said associated equipment includes view finding means for displaying images produced by said camera.

5. The equipment support of claim 4 and a view finding means attached to said equipment support means.

6. The equipment support of claim 4 wherein said view finding mean is spaced from said camera.

7. The equipment support of claim 6 wherein said view finding means is positioned to display said produced images to an operator without coming into contact with said operator.

8. The equipment support of claim 6 wherein said view finding means is spaced from said camera by a strut which progresses forward and generally below said camera.

9. The equipment support of claim 8 wherein said associated equipment includes a battery for operating said camera.

10. The equipment support of claim 9 wherein said battery is spaced from said view finding means and said camera.

11. The equipment support of claim 10 wherein said battery is spaced from said camera and said view finding means by a strut which progresses rearwardly from said view finding means and generally below said camera.

12. The equipment support of claim 3 wherein said associated equipment includes a battery for operating said camera, and a battery attached to said equipment support means.

13. The equipment support of claim 3 wherein said associated equipment includes view finding means for displaying images produced by said camera and a battery for operating said camera, separated from said camera and each other by interconnecting struts so that said center of gravity lies outside of said camera and is accessible to said handle means.

14. The equipment support of claim 13 and a view finding means and a battery attached to said equipment support means.

15. The equipment support of claim 13 wherein said equipment support means, said camera, said view finding means and said battery form an enclosure which is open to receive the arm of said operator.

16. The equipment support of claim 15 wherein said enclosure is open to the rear, facing said operator.

17. The equipment support of claim 3 and a camera attached to said equipment support means.

18. The equipment support of claim 17 wherein said equipment support means is integral with said camera.

19. The equipment support of claim 1 wherein said isolation means is adjustably positioned with respect to said center of gravity.

20. The equipment support of claim 19 wherein said isolation means is adjustable along one axis.

21. The equipment support of claim 20 wherein said isolation means is adjustable along two mutually perpendicular axes.

22. The equipment support of claim 21 wherein said isolation means is adjustable along three mutually perpendicular axes.

23. The equipment support of claim 19 wherein said isolation means is adjustably positioned with respect to said center of gravity by adjusting said center of gravity.

24. The equipment support of claim 19 wherein said isolation means is adjustably positioned with respect to said center of gravity by adjusting said isolation means.

25. The equipment support of claim 24 wherein said equipment support means includes a platform for receiving said equipment to be oriented.

26. The equipment support of claim 25 wherein said equipment to be oriented is loosely positionable upon said platform, and wherein said platform includes means for fixing said loosely positioned equipment to said platform.

27. The equipment support of claim 25 wherein said equipment to be oriented is seated in fixed position upon said platform, and wherein said platform includes means for retaining said fixed equipment to said platform.

28. The equipment support of claim 25 wherein said platform includes means for adjustably positioning said handle means relative to said platform.

29. The equipment support of claim 28 wherein said positioning means incorporates a vernier adjustment for moving said handle means to fixed positions along said platform.

30. The equipment support of claim 29 wherein said positioning means positions said center of gravity axially within said handle means, thereby leveling said equipment to be oriented upon said equipment support means.

31. The equipment support of claim 29 wherein said positioning means is an x-y table.

32. The equipment support of claim 29 wherein said positioning means incorporates an adjustment for moving said handle means to fixed positions toward and away from said platform.

33. The equipment support of claim 32 wherein said handle means is threadingly engaged by said platform.

34. The equipment support of claim 32 wherein said positioning means positions said center of gravity in substantial alignment with the isolation means comprising said handle means.

35. The equipment support of claim 34 wherein said center of gravity is positioned slightly below said isolation means, so that said equipment support means is generally bottom-heavy.

36. The equipment support of claim 35 wherein said center of gravity is about 1/16 of an inch below said isolation means.

37. The equipment support of claim 32 wherein said equipment support means includes means for retaining said handle means in said fixed positions toward and away from said platform.

38. The equipment support of claim 37 wherein said retaining means is associated with said handle means.

39. The equipment support of claim 38 wherein said retaining means includes a pin retractably associated with said handle means and a slot formed in portions of the platform for receiving said handle means.

40. The equipment support of claim 39 wherein said pin and slot cooperate to retain said handle means in a uniformly directed orientation.

41. The equipment support of claim 40 wherein said uniformly directed orientation automatically positions features of said handle means in proper position to be grasped.

42. The equipment support of claim 1 wherein said isolation means provides angular isolation about three mutually perpendicular axes.

43. The equipment support of claim 42 wherein said isolation means is a ball joint.

44. The equipment support of claim 42 wherein said isolation means is a gimbal.

45. The equipment support of claim 44 wherein said gimbal is sized for containment fully within the confines of said orienting portion.

46. The equipment support of claim 45 wherein said gimbal is sized to be contained fully within and between said orienting portion and said gripping portion.

47. The equipment support of claim 44 wherein said gripping portion, said gimbal and said orienting portion are axially alignable.

48. The equipment support of claim 47 wherein portions of said handle means connecting said gripping portion and said gimbal are axially offset relative to one another.

49. The equipment support of claim 48 wherein said offset is from about 20-30 degrees.

50. The equipment support of claim 1 and handle means attached to said equipment support means.

51. The equipment support of claim 50 wherein the gripping portion of said handle means includes finger receiving notches for locating said hand relative to said handle means.

52. The equipment support of claim 1 wherein the orienting portion of said handle means is attached to said equipment support means.

53. The equipment support of claim 1 wherein the orienting portion of said handle means includes a control surface accessible by the hand of said operator.

54. The equipment support of claim 53 wherein access of the hand of said operator to said control surface is limited to restrict leverage upon said control surface, and thereby restrict motive forces applied to said orienting portion.

55. The equipment support of claim 54 wherein said control surface is proportioned in relation to said equipment support.

56. The equipment support of claim 53 wherein said control surface surrounds said isolation means.

57. The equipment support of claim 56 wherein said control surface overlies approximately 50% of said isolation means.

58. The equipment support of claim 56 wherein said control surface further extends longitudinally from said orienting portion and along said isolation means.

59. The equipment support of claim 58 wherein a diametric line connecting said extended control surface and the control surface which surrounds said isolation means intersects said center of gravity.

60. The equipment support of claim 58 wherein said extended control surface extends from a forward end of said orienting portion.

61. The equipment support of claim 1 wherein said gripping portion and said orienting portion are engaged by a single hand.

62. The equipment support of claim 61 wherein said gripping portion is engaged by the middle, ring and little fingers of said hand and said orienting portion is engaged by the thumb and index finger of said hand.

63. The equipment support of claim 61 wherein said gripping portion lies generally below said gimbal.

64. The equipment support of claim 63 wherein said orienting portion lies generally above said gimbal.

65. The equipment support of claim 63 wherein said orienting portion lies generally below said gimbal.

66. The equipment support of claim 1 wherein said equipment support means includes an additional weighted member for adjusting said expanded, balanced arrangement.

67. A method for recording images of improved stability, comprising the steps of:
operating a camera attached to an equipment support according to claim 1 to record said images; and
supporting the gripping portion of the handle means of said equipment support while directing the orienting portion of said handle means toward the images to be recorded.

68. The method of claim 67 wherein said orienting portion is hand-held.

69. The method of claim 68 wherein said gripping portion is hand-held.

70. The method of claim 69 wherein said orienting portion and said gripping portion are held by a single hand.

71. The method of claim 67 which further comprises minimizing distortions of said images during said supporting and orienting.

72. The method of claim 71 wherein said minimizing includes isolating the orienting portion of said handle means from angular movements of the gripping portion of said handle means.

73. A recording of a sequence of stabilized images produced according to the method of claim 67.

74. The recording of claim 73 wherein said recording is formed upon a reproducible recording medium.

75. An equipment support which is capable of being hand-guided with improved stability against angular deviations in pan, tilt and roll to isolate equipment for use with said equipment support, including equipment to be oriented and equipment associated with said equipment to be oriented, from unwanted angular movements caused by motion of the equipment support when in use, comprising:
equipment support means for receiving said equipment in an expanded, balanced arrangement which provides an accessible center of gravity;
handle means for supporting the weight of said equipment and said equipment support means, and including isolation means for coupling said handle means with said equipment support means while isolating said equipment support means from said unwanted angular movements caused by motion of said equipment support means responsive to movement of said handle means; and
means for orienting said supported equipment for controlled pan, tilt and roll free from said unwanted angular movements and aligned with said isolation means and said equipment to be oriented.

76. The equipment support of claim 75 wherein said orienting means is positioned between said isolation means and said equipment to be oriented.

77. The equipment support of claim 75 wherein said equipment support means includes means for adjusting the location of said handle means relative to said equipment support means.

78. The equipment support of claim 77 wherein said location is adjustable along three mutually perpendicular axes.

79. The equipment support of claim 77 wherein said isolation means is located substantially at said center of gravity.

80. A handle for an equipment support of improved stability against angular deviations in pan, tilt and roll, for engagement by at least one hand of an operator, to isolate equipment associated with said equipment support from unwanted angular movements caused by motion of the equipment support when in use, said equipment support including means for receiving said equipment in an expanded, balanced arrangement which provides an accessible center of gravity, and said handle comprising a gripping portion for supporting and transporting the weight of said equipment and said equipment support and an orienting portion for orienting said equipment, coupled by means for isolating said orienting portion and said equipment from unwanted angular movements of said gripping portion.

81. The handle of claim 80 wherein said isolation means provides angular isolation about three mutually perpendicular axes.

82. The handle of claim 81 said isolation means is a ball joint.

83. The handle of claim 81 wherein said isolation means is a gimbal.

84. The handle of claim 83 wherein said gimbal is sized for containment fully within the confines of said orienting portion.

85. The handle of claim 84 wherein said gimbal is sized to be contained fully within and between said orienting portion and said gripping portion.

86. The handle of claim 83 wherein said gripping portion, said gimbal and said orienting portion are axially alignable.

87. The handle of claim 86 wherein portions of said handle connecting said gripping portion and said gimbal are axially offset relative to one another.

88. The handle of claim 87 wherein said offset is from about 20–30 degrees.

89. The handle of claim 80 wherein the gripping portion of said handle includes finger receiving notches for locating said hand relative to said handle.

90. The handle of claim 80 wherein the orienting portion of said handle is attached to said equipment support.

91. The handle of claim 80 wherein the orienting portion of said handle includes a control surface accessible by the hand of said operator.

92. The handle of claim 91 wherein access of the hand of said operator to said control surface is limited to restrict leverage upon said control surface, and thereby restrict motive forces applied to said orienting portion.

93. The handle of claim 92 wherein said control surface is proportioned in relation to said equipment support.

94. The handle of claim 91 wherein said control surface surrounds said isolation means.

95. The handle of claim 94 wherein said control surface overlies approximately 50% of said isolation means.

96. The handle of claim 94 wherein said control surface further extends longitudinally from said orienting portion and along said isolation means.

97. The handle of claim 96 wherein a diametric line connecting said extended control surface and the control surface which surrounds said isolation means intersects said center of gravity.

98. The handle of claim 96 wherein said extended control surface extends from a forward end of said orienting portion.

99. The handle of claim 80 wherein said gripping portion and said orienting portion are engaged by a single hand.

100. The handle of claim 99 wherein said gripping portion is engaged by the middle, ring and little fingers of said hand and said orienting portion is engaged by the thumb and index finger of said hand.

101. The handle of claim 99 wherein said gripping portion lies generally below said gimbal.

102. The handle of claim 101 wherein said orienting portion lies generally above said gimbal.

103. The handle of claim 101 wherein said orienting portion lies generally below said gimbal.

104. An equipment support which is capable of being hand-held with improved stability against angular deviations in pan, tilt and roll to isolate equipment for use with said equipment support, including equipment to be oriented and equipment associated with said equipment to be oriented, from unwanted angular movements caused by motion of the equipment support when in use, comprising:
  equipment support means for receiving said equipment in an expanded, balanced arrangement which provides a center of gravity which is accessible by handle means for engagement by at least one hand of an operator and including a gripping portion for supporting and transporting the weight of said equipment and said equipment support means, and an orienting portion for orienting said equipment to be oriented, coupled by means for isolating said orienting portion from said unwanted angular movements of said gripping portion; and
  means for adjustably positioning the isolation means of said handle means with respect to said center of gravity.

105. The equipment support of claim 104 wherein said isolation means is adjustable along one axis.

106. The equipment support of claim 105 wherein said isolation means is adjustable along two mutually perpendicular axes.

107. The equipment support of claim 106 wherein said isolation means is adjustable along three mutually perpendicular axes.

108. The equipment support of claim 104 wherein said isolation means is adjustably positioned with respect to said center of gravity by adjusting said center of gravity.

109. The equipment support of claim 104 wherein said isolation means is adjustably positioned with respect to said center of gravity by adjusting said isolation means.

110. The equipment support of claim 109 wherein said equipment support means includes a platform for receiving said equipment to be oriented.

111. The equipment support of claim 110 wherein said equipment to be oriented is loosely positionable upon said platform, and wherein said platform includes means for fixing said loosely positioned equipment to said platform.

112. The equipment support of claim 110 wherein said equipment to be oriented is seated in fixed position upon said platform, and wherein said platform includes means for retaining said fixed equipment to said platform.

113. The equipment support of claim 110 wherein said platform includes means for adjustably positioning said handle means relative to said platform.

114. The equipment support of claim 113 wherein said positioning means incorporates a vernier adjustment for moving said handle means to fixed positions along said platform.

115. The equipment support of claim 114 wherein said positioning means positions said center of gravity axially within said handle means, thereby leveling said equipment to be oriented upon said equipment support means.

116. The equipment support of claim 114 wherein said positioning means is an x-y table.

117. The equipment support of claim 114 wherein said positioning means incorporates an adjustment for moving said handle means to fixed positions toward and away from said platform.

118. The equipment support of claim 117 wherein said handle means is threadingly engaged by said platform.

119. The equipment support of claim 117 wherein said positioning means positions said center of gravity in substantial alignment with the isolation means comprising said handle means.

120. The equipment support of claim 119 wherein said center of gravity is positioned slightly below said isolation means, so that said equipment support means is generally bottom-heavy.

121. The equipment support of claim 120 wherein said center of gravity is about 1/16 of an inch below said isolation means.

122. The equipment support of claim 117 wherein said equipment support means includes means for retaining said handle means in said fixed positions toward and away from said platform.

123. The equipment support of claim 122 wherein said retaining means is associated with said handle means.

124. The equipment support of claim 123 wherein said retaining means includes a pin retractably associated with said handle means and a slot formed in portions of the platform for receiving said handle means.

125. The equipment support of claim 124 wherein said pin and slot cooperate to retain said handle means in a uniformly directed orientation.

126. The equipment support of claim 125 wherein said uniformly directed orientation automatically positions features of said handle means in proper position to be grasped.

* * * * *